(12) United States Patent
Schwer et al.

(10) Patent No.: US 10,878,241 B2
(45) Date of Patent: Dec. 29, 2020

(54) AUGMENTED REALITY DEVICE

(71) Applicant: SICK AG, Waldkirch (DE)

(72) Inventors: Felix Schwer, Waldkirch (DE); Frank Haberstroh, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 16/368,074

(22) Filed: Mar. 28, 2019

(65) Prior Publication Data
US 2019/0303672 A1 Oct. 3, 2019

(30) Foreign Application Priority Data
Mar. 29, 2018 (EP) .................................... 18165111

(51) Int. Cl.
| | | |
|---|---|---|
| *G06K 9/00* | (2006.01) | |
| *G06K 9/20* | (2006.01) | |
| *G06T 1/00* | (2006.01) | |
| *G06T 11/20* | (2006.01) | |
| *G06T 11/60* | (2006.01) | |
| *G08C 17/02* | (2006.01) | |

(Continued)

(52) U.S. Cl.
CPC ......... *G06K 9/00671* (2013.01); *G05B 17/02* (2013.01); *G05B 19/4183* (2013.01); *G06K 9/2081* (2013.01); *G06T 1/0014* (2013.01); *G06T 11/203* (2013.01); *G06T 11/60* (2013.01); *G08C 17/02* (2013.01); *G05B 19/409* (2013.01); *G05B 2219/32014* (2013.01); *G05B 2219/36432* (2013.01); *G05B 2219/39449* (2013.01); *G05B 2219/39451* (2013.01); *G06K 2209/19* (2013.01); *G08C 2201/34* (2013.01)

(58) Field of Classification Search
CPC combination set(s) only.
See application file for complete search history.

(56) References Cited

U.S. PATENT DOCUMENTS 6,282,455 B1  8/2001  Engdahl
8,594,814 B2  11/2013  Rovaglio et al.
(Continued)

FOREIGN PATENT DOCUMENTS

DE  19953739 C2  10/2001

OTHER PUBLICATIONS

Search Report dated Oct. 5, 2018 issued in corresponding European Application No. 18165111.8.

*Primary Examiner* — Wesner Sajous
(74) *Attorney, Agent, or Firm* — Nath, Goldberg & Meyer; Jerald L. Meyer

(57) ABSTRACT

An augmented reality device includes a processing unit adapted to process data, and a display unit with a field of view, which is adapted to display a control, control components and first connections between the control components as an extended real image, The control receives sensor data from at least one sensor and transmits actuator signals to at least one actuator of an industrial plant. The processing unit processes from the data a model of the industrial plant with the control, the sensor, the actuator and second connections as plant components, and processes position data of the plant components into the model. The position data of the display unit can be transmitted to the processing unit as GPS data by means of satellites or local position data by means of local sensors, and the processing unit processes the position data of the display unit into the model.

18 Claims, 3 Drawing Sheets

(51) Int. Cl.
*G05B 17/02* (2006.01)
*G05B 19/41* (2006.01)
*G05B 19/40* (2006.01)
*G05B 19/418* (2006.01)
*G05B 19/409* (2006.01)

(56) References Cited

U.S. PATENT DOCUMENTS

| | | | |
|---|---|---|---|
| 9,778,626 B2 * | 10/2017 | Nixon | G06F 3/04817 |
| 2012/0116728 A1 | 5/2012 | Shear et al. | |
| 2013/0246026 A1 | 9/2013 | Ceglia et al. | |
| 2016/0216706 A1 * | 7/2016 | Christensen | G05B 19/042 |

* cited by examiner

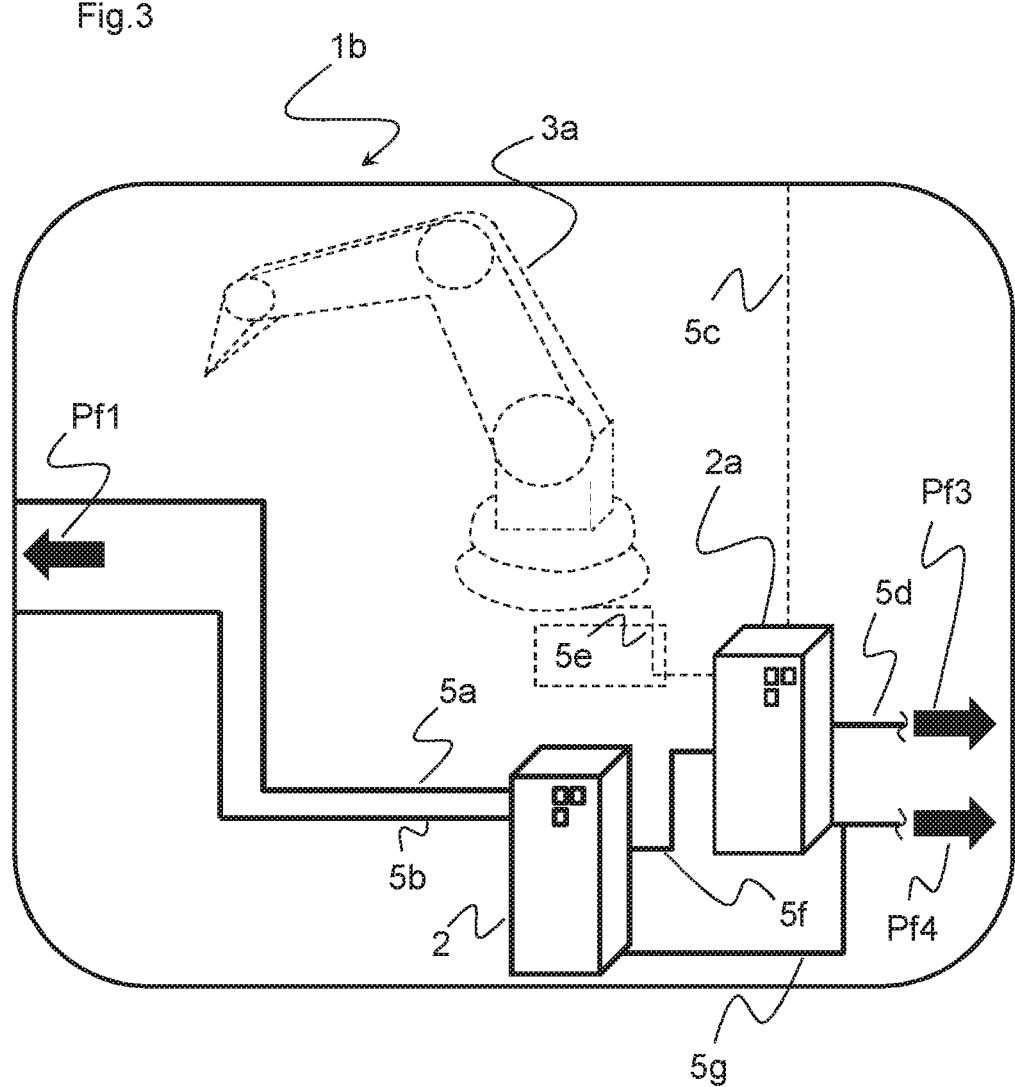

AUGMENTED REALITY DEVICE

FIELD

The invention relates to an augmented reality device, whereby the augmented reality device is referred hereinafter also to as the AR device.

BACKGROUND

The AR device is used in a wide variety of applications. In today's industry, for example, the AR device is used to provide a user with a representation of the real environment together with an extended reality map, so that the user can easily detect a possible deviation between the real map and the extended reality map. From this, a user using the AR device can extract a wide variety of information and take appropriate action.

For example, the AR device captures a complex real circuit of a control or control cabinet as a real environment and overlaps the mapping of the real circuit with a calculated virtual circuit of the control or control cabinet as an extended reality mapping. The user sees input and output units of the control as control components, whereby the interconnection represents connections between the control components.

From the overlap, the user can see a faulty wiring or an improved wiring as the deviation between the real and virtual wiring, so that the user can correct the faulty wiring or link the improved wiring based on the displayed deviation.

Such an AR device as described in DE 199 53 739 C2 enables the user to perceive a static real environment of the control with extended reality and to change the wiring of the control if necessary.

In today's industrial plants, the controls are connected with sensors and actuators arranged over a wide area, whereby the connections between the controls, the sensors and the actuators are not easily visible or recognizable like a network.

Thus, the AR device of the state of the art has the disadvantage that the user can see the interconnection of the individual control real and virtual, but does not recognize the connections or the network of the industrial plant. This means, for example, that it is not clear to the user which sensors or actuators could be affected if he changes connections on the control system, so that errors in the operation of the industrial plant can result.

US 2013 246026 A1 describes a system plant consisting of machines, associated sensors, data and connection lines and a data system and computer system. The data of the system is collected by the data system and displayed on a screen of the computer system as a virtual model. A user can navigate through the virtual model to view plant parts, connections and invisible plant parts and connections.

SUMMARY

U.S. Pat. No. 6,282,455 B1 describes a human-machine interface with a terminal and a display, with which a user can create an industrial plant as virtual images and view the interaction of the individual plant components in detail. Via the terminal, it is possible for the user to enter position data, operating data and design data of the plant components as a data node tree and thus create an interconnected virtual environment in which the user can move virtually and also edit the environment.

The disadvantage here is that the user moves in a purely virtual environment.

It is a task of the invention to improve an augmented reality device or AR device in such a way that a user of the AR device can easily find his way in a network of connections of a real industrial plant.

The task is solved according to the invention by an augmented reality device with a processing unit adapted to process data, a display unit adapted to display a control. Control components and connections between the control components as an extended real image, in which the control receives sensor data from at least one sensor and transmits actuator signals to at least one actuator of an industrial plant. The processing unit processes from the data a model of the industrial plant with the control, the sensor, the actuator and second connections as plant components, and processes position data of the plant components into the model. The position data of the display unit can be transmitted to the processing unit as GPS data by means of satellites or local position data by means of local sensors, and the processing unit processes the position data of the display unit into the model. The display unit is designed to represent the industrial plant with the plant components and their second connections as a function of the position and the field of view of the display unit in the model as the extended real image.

In other words, the augmented reality device comprises a processing unit adapted to process data and a display unit having a field of view adapted to display a control, control components and first connections between the control components as an expanded real image, the control receiving sensor data from at least one sensor and sending actuator signals to at least one actuator of an industrial plant, the processing unit processing from the data a model of the industrial plant having the control, the sensor, the actuator and second connections as plant components, and processing position data of the plant components into the model, wherein the position data of the display unit can be transmitted to the processing unit as GPS data by means of satellites or local position data by means of local sensors, and the processing unit processes the position data of the display unit into the model, wherein the display unit is designed to represent the industrial plant with the plant components and their second connections as a function of the position and the field of view of the display unit in the model as the extended real image.

This has the advantage that the user can easily visually recognize all plant components, especially their positions, within the industrial plant and the second connections between the plant components. In this context, first connections are understood to mean connections inside the control and second connections are understood to mean connections outside the control. Furthermore, the extended real image of the industrial plant means that a virtual image of the industrial plant based on the model with the second connections is displayed above a real image of the industrial plant.

According to a preferred execution example, the data includes CAD data of the industrial plant, making the model of the industrial plant technically easy to create.

The advantage of transmitting the position data of the display unit as GPS data by means of satellites or local position data by means of local sensors to the processing unit is that an exact localization of the display unit of the AR device or of the user is possible and an exact alignment of the field of view of the display unit with the respective system components can be determined.

According to a preferred design example, the second connections can be displayed on the display unit as colored lines between the system components. In other words, the different second connections of the plant components are visible to the user through the colored lines on the display unit and can be easily distinguished, making it easier for the user to find his way around the industrial plant network. The model can preferably also be displayed as a miniaturized 3D map in a section of the display unit, which significantly improves the user's orientation in the industrial plant with the AR device.

According to another preferred design example, the display unit is designed to display wired and/or wireless second connections representing data connections, especially bus systems, and/or power supply connections between plant components in the real industrial plant. Advantageously, the data connections and/or power supply connections can be represented differently, especially as solid or dashed lines. This gives the user the advantage of being able to recognize and distinguish all second connections of the plant components or the network of the industrial plant. This makes it possible for the user to see which system components he would influence if he changed a particular second connection.

Furthermore, according to a preferred design example, the display unit is designed to make non-visible system components visible to the user by means of a marker and/or at least one direction indicator in the direction of the non-visible system components. It is advantageous to display the direction indicator in the form of an arrow on the display unit. Preferably, the direction indicator is visible in the display unit until the system component has become visible to the user.

This has the advantage that the user is guided along the second connection, for example from the control system located in front of the user to a system component located far away.

According to another preferred execution example, a selection tool is provided for the selective selection of a plant component of the industrial plant, so that only the selected plant component and its respective second connections are highlighted for the user. In particular, the selected plant components, their respective second connections and the other plant components connected to the selected plant component are flashing and/or can be displayed in color, the non-selected plant components and the plant components not connected to the selected plant component being transparently displayable or hidden.

Furthermore, according to a preferred design example, the AR device includes a pair of glasses, a helmet display or an electronic communication device, in particular a smartphone or touchpad, so that the use of the AR device can be simple and convenient.

The device according to the invention can be designed in a similar way by further features and shows similar advantages. Such further features are exemplary, but not exhaustive, described in the dependent claims following the independent claim.

BRIEF DESCRIPTION OF THE DRAWINGS

The invention is also explained below with regard to further advantages and features by reference to the attached drawing using examples of execution. The figures of the drawing show in:

FIG. 3 a further schematic detail representation of the display unit.

DETAILED DESCRIPTION

Figure 1:
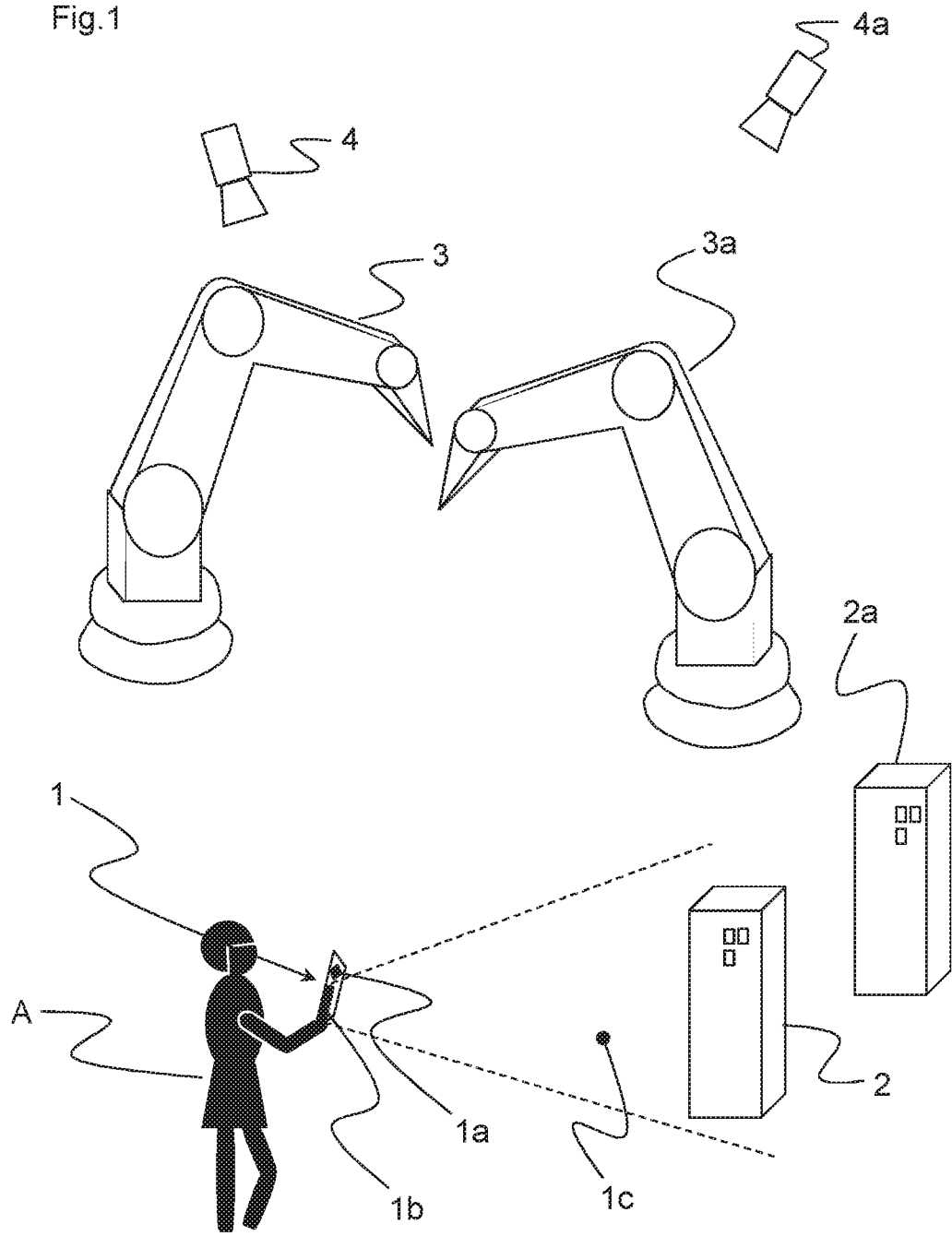
FIG. 1 a schematic representation of an industrial plant in which the inventive augmented reality device is used.

FIG. 1 shows a schematic representation of an exemplary industrial plant in which a user A uses an inventive augmented reality device 1, which is referred to below as AR device 1.

The exemplary industrial plant comprises two controls 2 and 2a, each connected to an actuator 3 and 3a. Also only one control 2 can be provided, which is connected to both actuators 3 and 3a. The actuators 3 and 3a can be for example industrial robots, punching machines, conveyor belts or the like. In addition, the controls 2 and 2a are connected to sensors 4 and 4a which send sensor data to the controls 2 and 2a so that the controls 2 and 2a send actuator signals to actuators 3 and 3a in order to control the actuators 3 and 3a. The controls 2 and 2a can be connected to each other and to a higher-level, not shown overall control. The controls 2 and 2a, the actuators 3 and 3a and the sensors 4 and 4a are understood in the following as system components.

AR device 1 comprises a processing unit 1a intended for processing data, the data comprising in particular CAD data of the industrial plant. Processing unit 1a is a processor, also referred to as CPU. Preferably, the processor can also be provided in a separately arranged computer, or a computing unit integrated in the control 2 and 2a or the sensor 4 and 4a, so that a transmission of processed data to the AR device 1 is possible. Further, the AR apparatus 1 comprises a display unit 1b having a field of view 1c, wherein the display unit 1b is provided to display the control 2 and 2a, control components and first connections between the control components as an expanded real image. The control components include, for example, input and output units of the control 2 and 2a, which are not shown in FIG. 1.

In accordance with the invention, the processing unit 1a processes from the data a model of the industrial plant with the controls 2 and 2a, the actuator 3 and 3a, the sensor 4 and 4a and second connections (shown in FIG. 2) as plant components. Furthermore, the processing unit 1a processes position data of the plant components and the display unit 1b into the model. The display unit 1b is designed according to the invention to represent the industrial plant with the plant components and their second connections depending on the position and the field of view 1c of the display unit 1b in the model as the extended real image.

Figure 2:
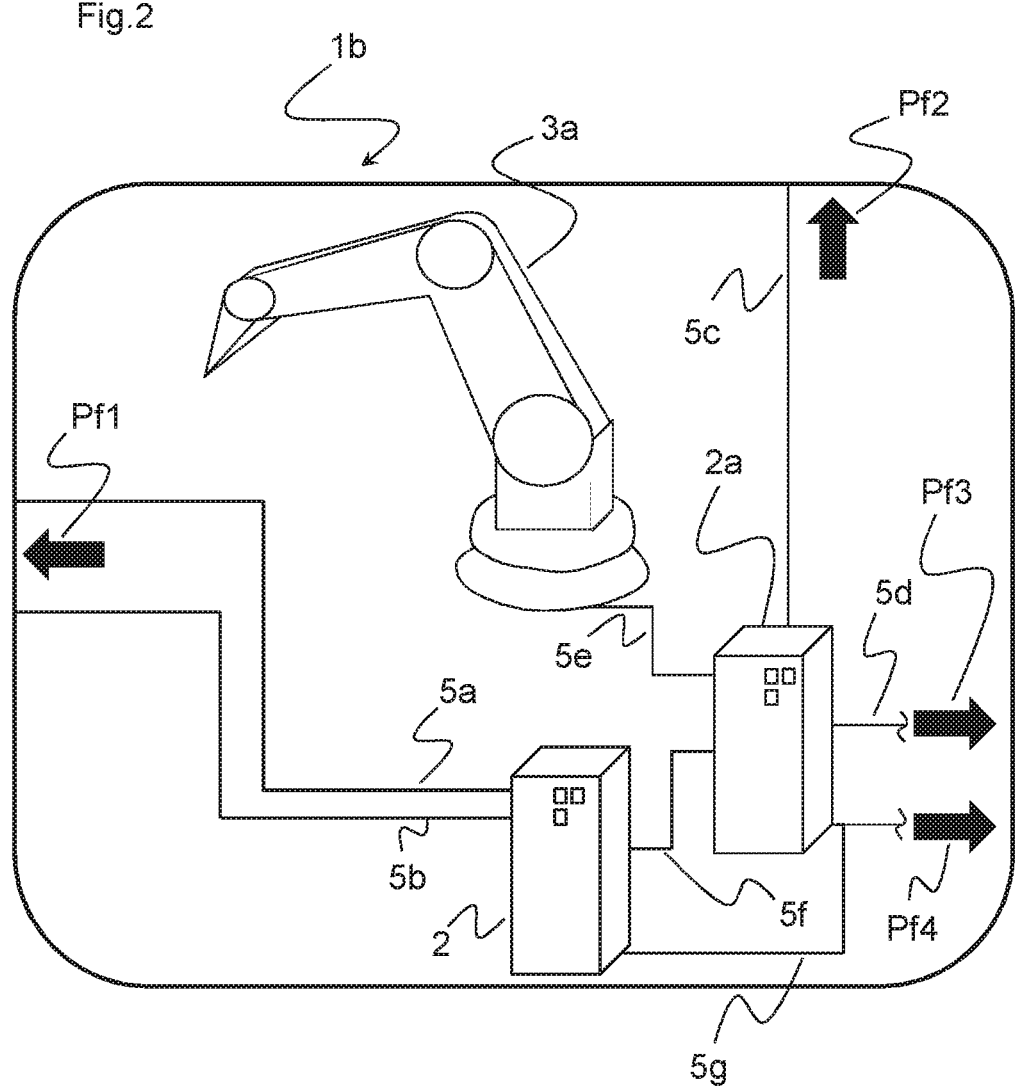
FIG. 2 a schematic detail representation of a display unit of the inventive augmented reality device.

In other words, if user A aligns AR device 1 for example in such a way that the field of view 1c of the display unit 1b is directed to a specific area of the industrial plant, in particular to the controls 2 and 2a as shown in FIG. 2, the controls 2 and 2a and their second connections 5a-5b to the respective visible actuator 3a and the invisible actuator 3 or the invisible sensors 4 and 4a, being connected to the controls 2 and 2a, are displayed as the extended real image to user A on the display unit 1b. In particular, the second connections 5a-59 can be displayed as colored lines in the model or in the extended real image on the display unit 1b.

In the industrial plant, the wired and/or wireless second connections 5a-5g are mostly hidden or not visible to user A (as shown in FIG. 1). The display unit 1b of the AR device 1 is in particular designed to display the wired and/or wireless second connections 5a-5g, which represent data connections, in particular bus systems and/or power supply connections between the plant components in the real industrial plant. Preferably the data connections and/or power supply connections are different representable, in particular as solid, dashed or similarly arranged lines.

FIG. 2 shows such an according to the invention described representation of the field of view 1c of the display unit 1b on the industrial plant, in which user A points the field of view 1c of the display unit 1b at the two controls 2 and 2a, so that the second connections 5a-5g between the plant components, which are not visible in FIG. 1, are shown visibly to user A in the display unit 1b. Preferably, the position data of the display unit 1b can be transmitted as GPS data to the processing unit 1a by means of satellites or local position data by means of local sensors 4 and 4a, so that an alignment of the field of view 1c of the display unit 1b can be determined exactly. In addition, the alignment of the field of view 1c can be determined by means of markers in the field of view 1c of the display unit 1b. The processing unit 1a is capable of detecting the markers and calculating the orientation of the visible area 1c based on the positions of the markers in the industrial plant.

From display unit 1b, user A can see all second connections 5a-5g between the in visual range 1c located controls 2 and 2a and actuator 3a and the not visible sensors 4 and 4a being connected to the controls 2, as well as the actuator 3 being not visible. In this example, the second connection 5a represents a connection between the control 2 in the foreground and the invisible actuator 3, the second connection 5b represents a connection between the control 2 in the foreground and the invisible sensor 4, the second connection 5c represents a connection between the control 2a in the background and the invisible sensor 4a, the second connection 5d is a connection between the two controls 2 and 2a and the superordinate, invisible overall control, the second connection 5e is a connection between the control 2a and the actuator 3a, the second connection 5f is a connection between the two controls 2 and 2a, and the second connection 5g is a connection between the two controls 2 and 2a and an unrepresented power supply.

In addition, the display unit 1b is designed to make the invisible system components visible to the user A by means of a marker and/or at least one direction indicator in the direction of the invisible system components. That is, as shown in FIG. 2, the direction indicator is displayed as four arrows Pf1-Pf4 on the display unit 1b, so that when user A pivots the field of view 1c of the display unit 1b towards one of the arrows Pf1-Pf4, the display unit 1b displays the second connection 5a-5g to the non-visible plant component being connected to the respective controls 2 and 2a. This allows user A to be easily guided along the displayed second connection 5a-5g to the connected system components. The direction indicator or arrows Pf1-PM are visible in the display unit 1b until the system component connected to the respective second connection 5a-5g has become visible to user A. The direction indicator or arrows Pf1-Pf4 are visible in the display unit 1b until the system component connected to the respective second connection 5a-5g has become visible to user A. The direction indicator or arrows Pf1-PM are visible in the display unit 1b until the system component connected to the respective second connection 5a-5g has become visible to user A.

In addition, a selection means, in particular a cursor and confirmation button, is provided for the selective selection of a plant component of the industrial plant, so that only the selected plant component and its respective second connections 5a-5g are displayed highlighted for user A. The selected plant component and its respective second connections 5a-5g are shown in the display.

As shown in FIG. 3, the control 2 in the foreground is selected by the user by means of the selection means so that the selected control 2, its respective second connections 5a, 5b, 5d, 5f and 5g and the plant components connected to the selected control 2 are displayed in bold, preferably flashing and/or colored. The system components not connected to the selected control 2, namely the actuator 3a and the second connections 50 and 5e, are shown transparent or with dashed lines or can also be hidden.

This facilitates the orientation of user A in the network of the second connections 5a-5g of the industrial plant.

The AR device 1 preferably comprises a pair of glasses, a helmet display or an electronic communication device, wherein the communication device may be a smartphone or a touchpad. The AR device 1 is therefore very handy and easy to use, so that user A has a high degree of freedom of movement with the AR device 1.

LIST OF REFERENCE

1 Augmented Reality Device/AR-Device
1a Processing unit
1b Display unit
1c Field of view
2, 2a Control
3, 3a Actuator
4, 4a Sensor
5a-5g Second connection
A User
Pf1-Pf4 Direction indicator or arrows

The invention claimed is:

1. An augmented reality device comprising:
a processing unit adapted to process data, and
a display unit with a field of view, which is adapted to display a control, control components and first connections between the control components as an extended real image, wherein the control receives sensor data from at least one sensor and transmits actuator signals to at least one actuator of an industrial plant,
wherein the processing unit processes from the data a model of the industrial plant with the control, the sensor, the actuator and second connections as plant components, and processes position data of the plant components into the model,
characterized in that position data of the display unit are transmitted to the processing unit as GPS data by means of satellites or local position data by means of local sensors, and the processing unit processes the position data of the display unit into the model,
wherein the display unit is designed to represent the industrial plant with the plant components and their second connections as a function of the position and the field of view of the display unit in the model as the extended real image, so that the display unit is moved accurately by an user within the industrial plant.

2. Augmented reality device according to claim 1, characterized in that the data comprise CAD data of the industrial plant.

3. Augmented reality device according to claim 1, characterized in that the second connections can be displayed as colored lines in the model on the display unit.

4. Augmented reality device according to claim 1, characterized in that the display unit is designed to display wired, wireless or both wired and wireless second connections which represent data connections, power supply connections or both data connections and power supply connections between the system components.

5. Augmented reality device according to claim 4, characterized in that the data connections, power supply connections or both data connections and power supply connections are represented differently.

6. Augmented reality device according to claim 1, characterized in that the display unit is designed to make invisible plant components recognizable to the user by means of a marker, at least one direction indicator or both marker and at least one direction indicator in the direction of the invisible plant components.

7. Augmented reality device according to claim 6, characterized in that the direction display can be displayed in the form of an arrow on the display unit.

8. Augmented reality device according to claim 6, characterized in that the direction display is visible in the display unit until the system component has become visible to the user.

9. Augmented reality device according to claim 1, characterized in that a selection means is provided for selectively selecting an installation component of the industrial installation, so that only the selected installation component and its respective second connections are displayed highlighted to the user.

10. Augmented reality device according to claim 9, characterized in that the selected plant component, its respective second connections and the other plant components connected to the selected plant component are flashing, displayed in color, or both flashing and displayed in color and the non-selected plant components and plant components being not connected to the selected plant component can be are displayed transparently or hidden.

11. Augmented reality device according to claim 5, characterized in that the data connections, power supply connections or both data connections and power supply connections are represented as solid, dashed or similarly shaped lines.

12. Augmented reality device according to claim 7, characterized in that the direction display is visible in the display unit until the system component has become visible to the user.

13. An augmented reality device comprising:
a processing unit adapted to process data, and
a display unit with a field of view, which is adapted to display a control, control components and first connections between the control components as an extended real image, wherein the control receives sensor data from at least one sensor and transmits actuator signals to at least one actuator of an industrial plant,
wherein the processing unit processes from the data a model of the industrial plant with the control, the sensor, the actuator and second connections as plant components, and processes position data of the plant components into the model,
characterized in that:
position data of the display unit are transmitted to the processing unit as GPS data by means of satellites or local position data by means of local sensors,
the processing unit processes the position data of the display unit into the model, and
the display unit is designed to make invisible plant components recognizable to the user by means of a marker, at least one direction indicator or both marker and at least one direction indicator in the direction of the invisible plant components,
wherein the display unit is designed to represent the industrial plant with the plant components and their second connections as a function of the position and the field of view of the display unit in the model as the extended real image.

14. Augmented reality device according to claim 13, characterized in that the direction display can be displayed in the form of an arrow on the display unit.

15. Augmented reality device according to claim 14, characterized in that the direction display is visible in the display unit until the system component has become visible to the user.

16. Augmented reality device according to claim 13, characterized in that the direction display is visible in the display unit until the system component has become visible to the user.

17. An augmented reality device comprising:
a processing unit adapted to process data, and
a display unit with a field of view, which is adapted to display a control, control components and first connections between the control components as an extended real image, wherein the control receives sensor data from at least one sensor and transmits actuator signals to at least one actuator of an industrial plant,
wherein the processing unit processes from the data a model of the industrial plant with the control, the sensor, the actuator and second connections as plant components, and processes position data of the plant components into the model,
characterized in that position data of the display unit are transmitted to the processing unit as GPS data by means of satellites or local position data by means of local sensors, the processing unit processes the position data of the display unit into the model, and a selection means is provided for selectively selecting an installation component of the industrial installation, so that only the selected installation component and its respective second connections are displayed highlighted to the user,
wherein the display unit is designed to represent the industrial plant with the plant components and their second connections as a function of the position and the field of view of the display unit in the model as the extended real image.

18. Augmented reality device according to claim 17, characterized in that the selected plant component, its respective second connections and the other plant components connected to the selected plant component are flashing, displayed in color or both flashing and displayed in color and the non-selected plant components and plant components being not connected to the selected plant component are displayed transparently or hidden.

* * * * *

UNITED STATES PATENT AND TRADEMARK OFFICE
CERTIFICATE OF CORRECTION

PATENT NO. : 10,878,241 B2
APPLICATION NO. : 16/368074
DATED : December 29, 2020
INVENTOR(S) : Felix Schwer and Frank Haberstroh Page 1 of 1

It is certified that error appears in the above-identified patent and that said Letters Patent is hereby corrected as shown below:

In the Claims

Claim 10, Column 7, Line 32, please delete the phrase "can be".

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*